(12) United States Patent
Bain, III

(10) Patent No.: US 8,209,549 B1
(45) Date of Patent: Jun. 26, 2012

(54) SYSTEMS AND METHODS FOR CRYPTOGRAPHIC MASKING OF PRIVATE DATA

(75) Inventor: Frank Leslie Bain, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1651 days.

(21) Appl. No.: 11/583,558

(22) Filed: Oct. 19, 2006

(51) Int. Cl.
*G06F 21/00* (2006.01)
*G06Q 20/38* (2006.01)
(52) U.S. Cl. ............... 713/193; 380/2; 380/252; 705/64
(58) Field of Classification Search .................. 713/189, 713/193, 194; 726/26; 380/28–30; 705/1–3
See application file for complete search history.

(56) References Cited

U.S. PATENT DOCUMENTS

| | | | | |
|---|---|---|---|---|
| 2002/0073138 | A1* | 6/2002 | Gilbert et al. | 709/201 |
| 2003/0163737 | A1* | 8/2003 | Roskind | 713/201 |
| 2005/0002524 | A1* | 1/2005 | Hsieh et al. | 380/31 |
| 2008/0082834 | A1* | 4/2008 | Mattsson | 713/189 |
| 2008/0133389 | A1* | 6/2008 | Schowengerdt et al. | 705/34 |

OTHER PUBLICATIONS

"Data Sanitization Techniques", http://www.Net2000Ltd.com, Whitepaper obtained through Google Scholar search,(2005),10 p.
Oliveira, S. R., et al., *Protecting Sensitive Knowledge by Data Sanitization*, Whitepaper Found through Google Scholar search,(Found Oct. 10, 2006),4 p.
Schneier, B. , *Applied Cryptography, Protocols, Algorithms, and Source Code in C*, 26, (1996),30-31, 351-355.
Seeberg, V. E., *Generation and use of test data sets in IDS Testing*, Whitepaper Found through Google Scholar Search,(Sep. 16, 2005),5 p.
Stinson, D. R., *Cyrptography: Theory and Practice*, CRC Press, Boca Raton, FL,(1995),232-254.
Veykios, V , et al., "State-of-theArt in Privacy Preserving Data Mining", *CERIAS Tech Report 2004-63*, Found using Google Scholar,(2004),9 p.

\* cited by examiner

*Primary Examiner* — Gilberto Barron, Jr.
*Assistant Examiner* — Malcolm Cribbs
(74) *Attorney, Agent, or Firm* — Brooks, Cameron & Huebsch, PLLC

(57) ABSTRACT

Systems and methods for cryptographically masking private data are described. The apparatus may include a masking engine to hash private data and a masking values table to provide a masked value using a lookup value derived from the hashed private data. The method my include receiving private data, transforming the private data into a set of masked data items and providing the set of masked data items.

12 Claims, 8 Drawing Sheets

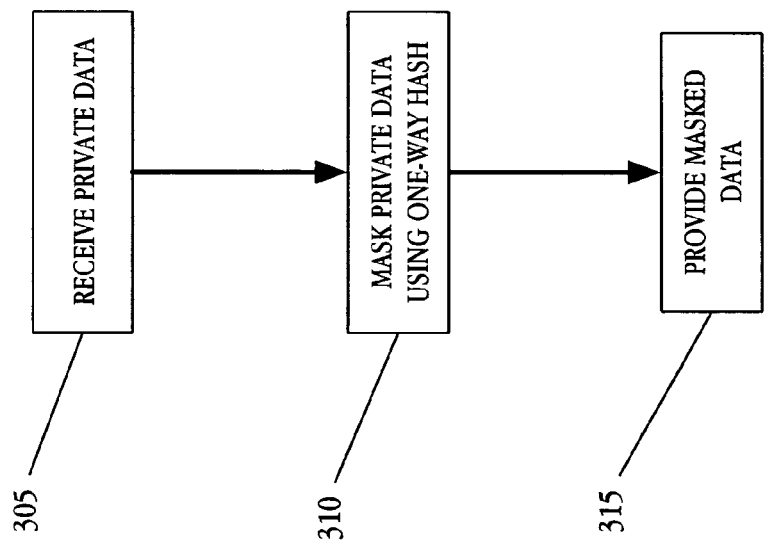

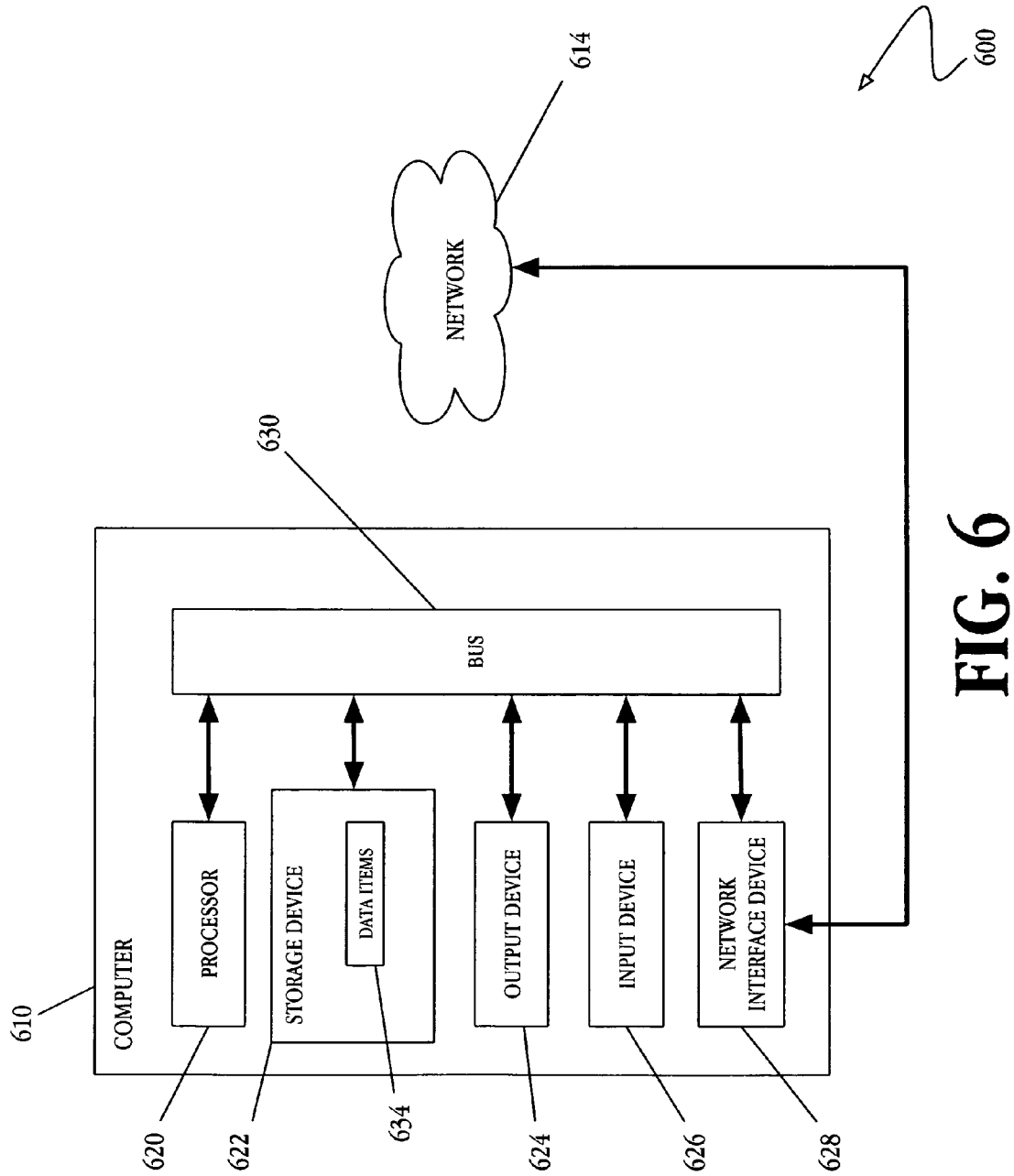

SYSTEMS AND METHODS FOR CRYPTOGRAPHIC MASKING OF PRIVATE DATA

TECHNICAL FIELD

This application relates to systems and methods for data protection and more particularly to sanitizing data for use in testing systems.

BACKGROUND

Customers demand more of the products and services they use than ever before. They insist that the companies they deal with on a regular basis provide them greater and greater levels of information and access. These companies are configuring and operating more and more complex systems that are capable of delivering highly integrated services to those customers.

These complex systems require a greater degree of testing before deployment due to the high integration of multiple systems being used. This testing can be a very long process, as is well known to those in the field of computer science. Some of these systems require actual data to be used for this testing, both for data integrity reasons as well as for testing the systems under actual loads.

SUMMARY

In an embodiment, a method of processing a set of private data items includes receiving a set of private data items, transforming the private data items into masked data items and providing the set of masked data items. The data items may be transformed using one-way hashing algorithms to derive a lookup value that can be used to retrieve a masked value from a table, in some examples. In a further embodiment, the masked data items are provided to testing system. In another embodiment, a method of anonymizing personal data includes receiving personal data from a user, transforming the personal data using a one-way hashing algorithm to obtain masked data and providing the masked data items. The masked data items contain no information that would identify the user, in some examples. In an embodiment, software modules are executed to mask private data, the software modules including a masking engine to hash a private data set to obtain a lookup value that can be used to retrieve a masked value from a masking values table and the masking values table coupled to the masking engine containing a plurality of masked values, each of which has a unique lookup value. In a further embodiment, a configuration data store containing a plurality of configuration files is coupled to the masking engine.

BRIEF DESCRIPTION OF DRAWINGS

Embodiments are illustrated by way of example and not limitation in the figures of the accompanying drawings, in which like references indicate similar elements and in which:

FIG. 3A shows a flowchart of a method for masking sets of private data, accordance with an example embodiment;

FIG. 6 shows a block diagram of a machine including instructions to perform any one or more of the methodologies described herein.

DETAILED DESCRIPTION

The following detailed description is divided into four sections. The first section presents an overview of embodiments of the inventive subject matter. The second section presents apparatus according to embodiments. The third section provides methods of using example embodiments of the inventive subject matter. The fourth section describes an example implementation and an alternative implementation of the inventive subject matter.

Overview

Developing and deploying systems that provide access to user information present a problem that is not encountered in other types of software applications. In order to fully test these systems prior to deployment, the systems need to be operated using actual data. In some examples, this testing may expose vulnerabilities in the systems that if exploited could lead to personally identifiable information (PII) being released. In other examples, personnel testing these systems may be outside contractors or employees not cleared to have access to that PII. PII, in the context of the present discussion, is any information that could be used to identify a single individual. Release of PII could lead to identify theft or fraud, financial fraud and the like.

One solution to the problem of supplying PII to test systems is to sanitize that data before using it for testing. This may include substitution of names, addresses and dates, using a simple substitution table. This type of substitution, in the context of message encryption, is known as the Caesar Cypher. It is also more commonly seen in periodicals as cryptogram puzzles. However, the private data can be found, given a large enough sample of the substituted data using these methods. Additionally, blind substitution does not preserve the data integrity of the data, making it unusable in some cases by the systems being tested without introducing additional possible errors in the system.

A better solution to the problem of supplying PII to test systems is to mask the personal data. Masking, as used herein, is meant to denote any operation that replaces actual data with other data, the other data capable of being used for testing, and preserves data integrity. By masking the data using one-way hash functions to provide a look-up into a table of suitable replacement data, the problems of dictionary-type attacks on the test data and loss of data integrity, can be overcome. Masking private data using one-way hash functions provides an efficient solution to the problem of using actual data on test systems.

Apparatus

Figure 1:
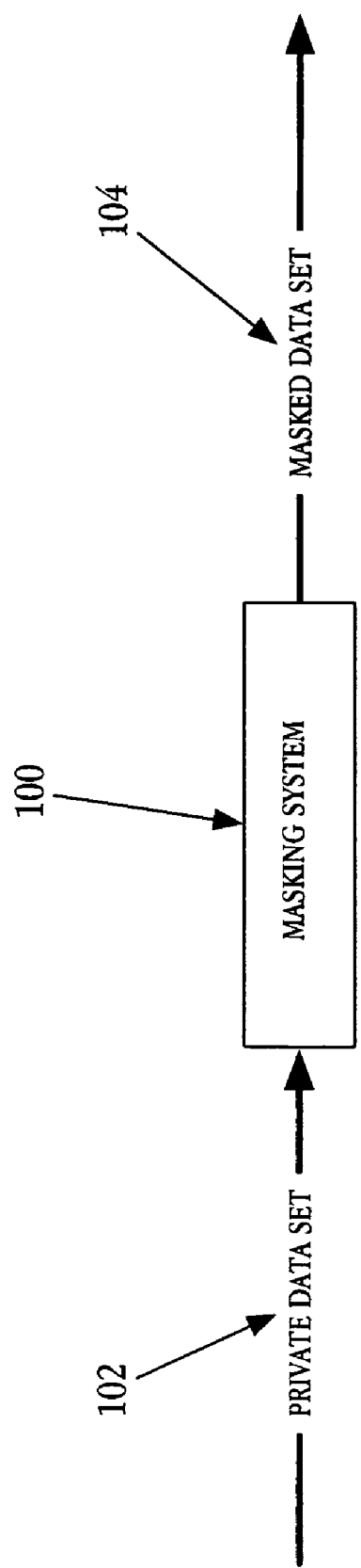
FIG. 1 shows a high level block diagram of an apparatus for masking sets of private data, in accordance with an example embodiment.

FIG. 1 shows a high level block diagram of an apparatus for masking sets of private data, in accordance with an example embodiment. In an embodiment, a masking system 100 receives private data set 102 as an input. The masking system 100 performs various operations, as will be described herein, and outputs masked data set 104. In one embodiment, the private data includes, without limitation, name data, address data, date data, phone number information, and the like. Private data can be considered to be any data that contains any personally identifiable information (PII) within it. The private data has three characteristics with respect to testing systems: it contains PII, it has data integrity, and it is suitable for testing. The masked data set 104 needs to have data integrity and be suitable for testing, but contain no personally identifiable information.

Testing suitability refers to a metric that differs as various systems are tested. With respect to a simple letter generation software, the address information can be masked to anything, as the testing is merely generating a letter product without regard to it being sent anywhere. However, with regard to a letter generation and delivery software package, the address information must be valid, in that a letter can actually be delivered through any suitable mechanism to that address. In the first case, a masked address, such as "111 Anywhere St" can be considered suitable for testing. In the second case, such a masked address is not suitable for testing as "111 Anywhere St" is not a valid address.

As discussed above, the masked data set 104 output by the masking system 100 needs to contain no PII. Additionally, the masked data set should be resistant to attempts to derive the PII from the masked data set using various cryptanalytic attacks. One-way hashing functions provide this type of security. A one-way hash function is a hash function that works in one direction. The operation to hash the data is considered to be computationally easy. One-way hash functions are used extensively in the secure transmission and verification of messages. A given message is hashed to obtain a hashed value. Any change to the message would alter the hashed value and expose the alteration. It is considered to be computationally difficult to generate a pre-image, the message, that hashes to a particular value. With respect to one-way hash functions, good one-way hash functions do not generate the same hashed value for two different pre-images. This is known as collision-free hash functions. In the context of the present discussion regarding private data, a collision could enable an attacker to derive the method of hashing (which will be discussed in greater detail below) and in turn expose the PII in the private data set 102.

Hash functions are publicly known and their method of hashing a pre-image is not secret. The security of the one-way hash function is in its unidirectional nature. The output is not dependent on the input in any discernible way. A single change in the input may change almost half of the bits in the hashed value. In other words, it is computationally unfeasible to find the input given the hashed value. Some example one-way hash functions that are considered to be suitable for the purpose of masking private data include, without limitation, HAVAL, MD2, MD4, MD5, PANAMA, RIPEMD, RIPEMD-128/256, RIPEMD-160/320, SHA-0, SHA-1, SHA-256/224, SHA-512/384, Tiger(2), VEST-4/8 (hash mode), VEST-16/32 (hash mode), and WHIRLPOOL. The MD5 algorithm appears to offer a good compromise between computational costs and security, and will be used for further discussion regarding masking private data. However, as the list of possible one-way hash functions show, use of the MD5 algorithm in the present discussion is not meant to be limiting in any manner and any suitable one-way hash function is considered to be within the scope of the present discussion.

Figure 2A:
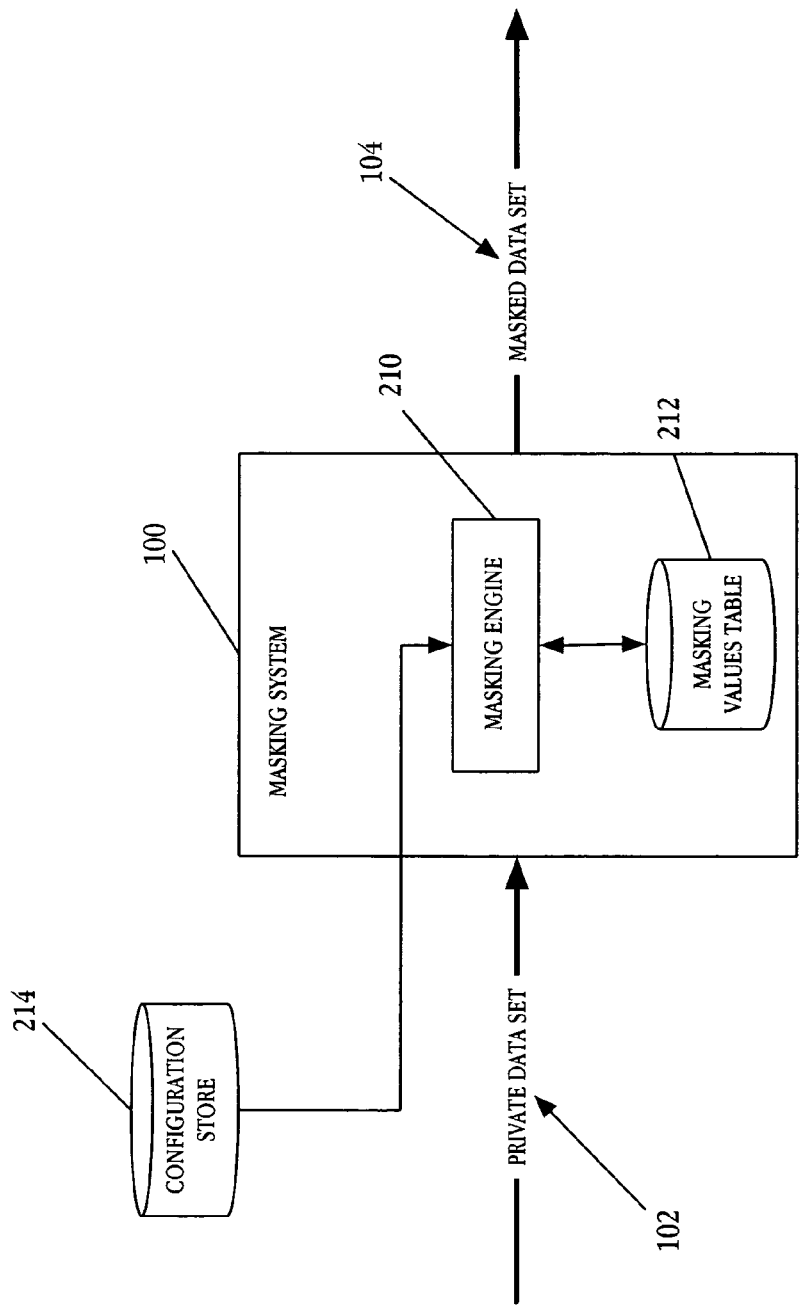
FIG. 2A shows a more detailed block diagram of apparatus for masking sets of private data, in accordance with an example embodiment.

FIG. 2A shows a more detailed block diagram of apparatus for masking sets of private data, in accordance with an example embodiment. In an embodiment, the masking system 100 includes a masking engine 210 coupled to a masking values table 212. The masking engine 210 may additionally be coupled to a configuration store 214, in some examples.

The masking engine 210 is configured to receive the private data set 102 and mask the private data using a one-way hash function, such as MD5, to output a masked data set 104. The masking engine 210 may be further configured to hash the private data to obtain look-up values, the look-up values used to obtain a masked data item from the masking values table. For instance, the private data item is a name "Robert", which is hashed to a value of 6, in this example. The masked value table 212 contains key-data value pairs, in one example, such as depicted in Table 1:

TABLE 1

| Key Value | Data Value |
|---|---|
| 0 | Robin |
| 1 | Arthur |
| 2 | Dennis |
| 3 | Tim |
| 4 | Lancelot |
| 5 | Galahad |
| 6 | John |
| 7 | Graham |
| 8 | Eric |
| 9 | Terry |

In this example, the hashed value of 6 yields the name "John." The masking engine 210, in this example, outputs "John" as a masked data item. It will be understood that a small table such as that depicted in Table 1 will yield multiple duplicates or collisions, when used in practice. In one embodiment, the masked value table 214 contains 4096 key-data value pairs. Other numbers of pairs can be used with the understanding that less numbers will result in more collisions, thereby decreasing the security of the function, and that more numbers will result in a computational cost to the masking function.

In an embodiment, the configuration data store 216, coupled to the masking engine 210, is configured to store configuration files, each of the configuration files containing information regarding initialization parameters for the masking engine. The initialization parameters may include, without limitation, a synchronization key, a data integrity tolerance value, data mapping values and the like. The synchronization key, in one example, provides an initialization vector for the hashing function of the masking engine. The synchronization key may be supplied prior to the masking engine 210 operating on the private data set 102. Alternately, the synchronization key can be dynamically generated using a time stamp at the time of the operations. In the former example, use of a known synchronization key allows the operator to run the private data through the masking system multiple times, knowing that the operations are the same on the private data set. The latter example can be used for one off testing, where the generated masked data set 104 will not be added to. If the generated masked data set 104 in the latter example requires additional information in the future, derivation of the dynamically generated synchronization key may require the intervention of support personnel and additional computational costs.

Figure 2B:
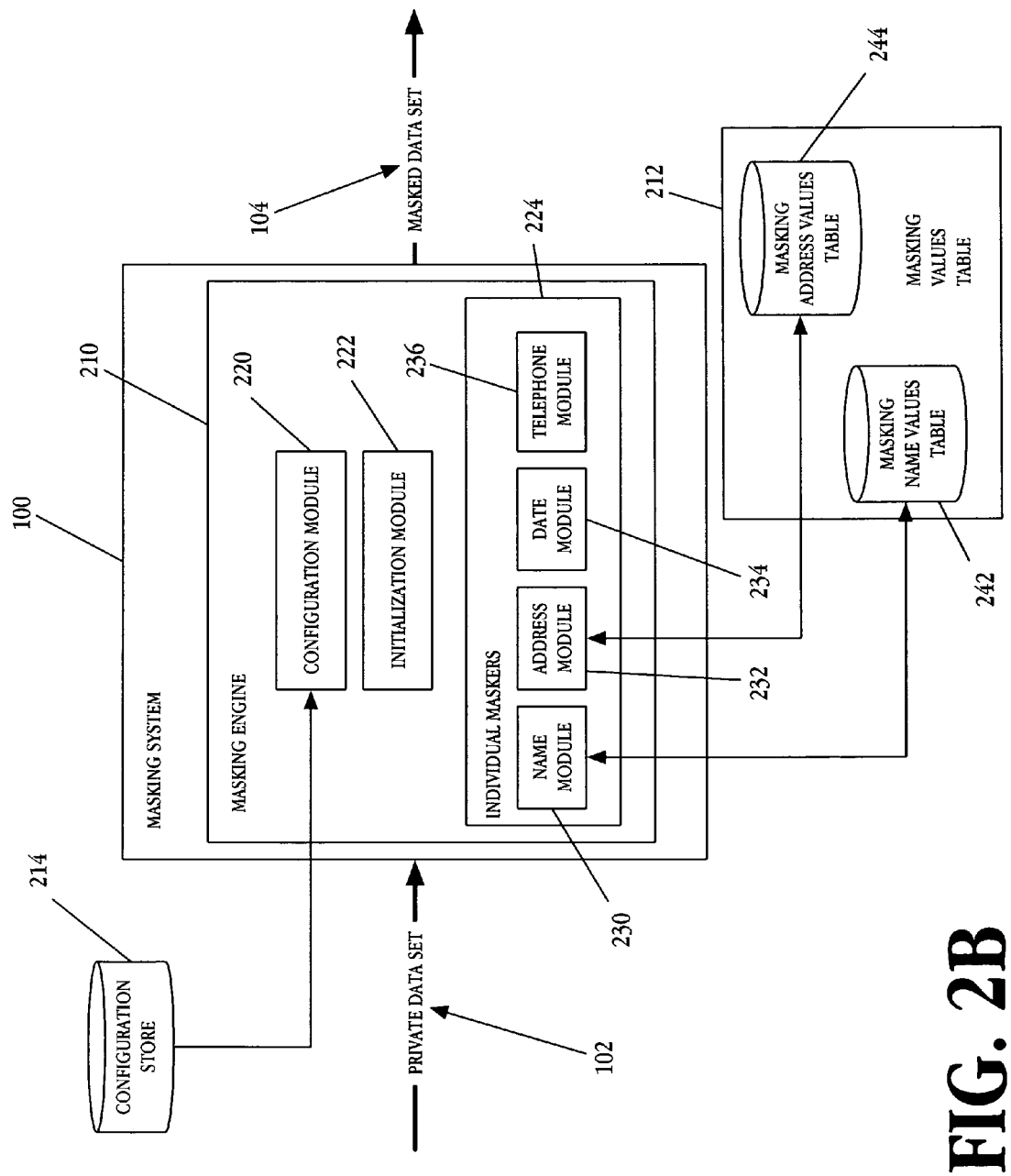
FIG. 2B shows a more detailed block diagram of apparatus for masking sets of private data, in accordance with an example embodiment.

FIG. 2B shows a more detailed block diagram of apparatus for masking sets of private data, in accordance with an example embodiment. In an embodiment, the masking engine 210 shown above in FIG. 2A includes a configuration module 220, an initialization module 222 and individual maskers 224. The configuration module 220 is coupled to the configuration store 214, in some examples. In alternate examples, the configuration store 214 is contained within the configuration module 220. The individual maskers 224 includes a name module 230, an address module 232, a date module 234, and a telephone module 236. Some of the individual maskers 224 may be coupled to one or more masking values tables 212, in some embodiments. The one or more masking values tables 212 include a masking names value table 242 and a masking address values table 244.

The configuration module 220 is configured to retrieve a configuration file from the configuration store 214. The configuration file contains information regarding the operation of the individual maskers, in some examples. Such information may include, without limitation <<EXACTLY WHAT IS DEFINED BY THE CONFIG FILE>>. The initialization module 222 is configured to receive the configuration file from the configuration module 220. In some examples, the initialization module 222 reads a synchronization key from the configuration file in order to provide an initialization vector for one way hash functions.

In an embodiment, the individual maskers 224 provide masking functions for each of the different data types contained within the private data set 102. These may include, without limitation, name values, address values, data values, telephone values, rank values, WARN note values, and the like. WARN not values are free-text entries in a private data set that contain information regarding either a customer or their accounts that can not be adequately captured anywhere else. One example of a WARN note is an indication regarding an individual customer that notes that their spouse is not authorized to access account information.

In an embodiment, the name module 230 is coupled to a masking name values table 242, the masking name values table 242 contained within the masking values table 212. The masking name values table 242 may include separate tables for each of the first, middle and last name possibilities, and an individual key value for each, in one embodiment. In an alternate embodiment, the masking name values table 242 contain a single key value for all three names, as shown in TABLE 2:

TABLE 2

| KEY VALUE | FIRST NAME | MIDDLE NAME | LAST NAME |
|---|---|---|---|
| 0 | Robin | Terry | Cleese |
| 1 | Arthur | Graham | Fawlty |
| 2 | Dennis | Galahad | Booth |
| 3 | Tim | Tim | Smith |
| 4 | Lancelot | Arthur | Jones |
| 5 | Galahad | Robin | Idle |
| 6 | John | Dennis | Chapman |
| 7 | Graham | Lancelot | Cleveland |
| 8 | Eric | John | Roosevelt |
| 9 | Terry | Eric | Lincoln |

In an embodiment, the name module 230 would input the synchronization key, and the names from the private data set, hash each data item, append the hashes together, and perform a modulo 10 (in the example provided here in Table 2) to arrive at a key value. The key value would provide a look-up to the table. For example, if the modulo 10 calculation returned a value of 6 for first name, 4 for middle name, and 2 for last name, the masked name returned as an output by the name module 230 would be John Arthur Booth in this example. As discussed above with respect to FIG. 2A, any number of rows in the masking name values table 242 may be used provided that the modulus function performed before looking up into the table be a modulo n function, where n is the number of data rows in the table.

In one embodiment, the masking name values table 242 is a static table with values pre-entered for each of the first, middle and last names. In an alternate embodiment, the masking name values table 242 provides a conduit for the dynamic query and retrieval of names from a census database. Use of such dynamic query and retrieval would further increase the security and unidirectional nature of the masking functions, but may represent an increase in computational costs that outweigh the need for such additional security for the function.

In an embodiment, the address module 232 is coupled to the masking address values table 244 contained within the masking values table 212. The masking address values table 244 may include individual tables for each of the elements needed to define a mailing address. At a minimum, those elements should include an address line 1, an address line 2, a suite/apt number, a city, a state and a zip code. The address module, in one embodiment, is configured to operate on the address values in the private data set similarly to the name module. However, the nature of address information requires additional logic to be implemented in the address module. Depending on the type of system to be tested, and as defined by the configuration file retrieved from the configuration store 214 and processed by the configuration module 220, the masked address value may need to be a verifiable address, or an address within a certain amount of distance from the original address, or one of a listing of valid addresses in a particular zip code. In its most general sense, the address must be able to define a physical location that is suitable for quoting an insurance policy. Insurance policies, especially auto insurance policies though not limited to only them, are quoted based on a physical location. For example, a car parked in a high crime area represents a higher risk to the insurance company then a car parker in a low crime area. Therefore, the insurance premium should be higher to cover that additional risk. The address module 232 can be configured to take this into account, and a data item within the configuration file can be used to turn on or off the functionality in the address module 232 that returns a masked address value that is suitable for quoting.

In an embodiment, the date module 234 is configured to perform one-way hash function on the date values contained within the private data set 102 and returned a masked date value. The date module 234 is further configured to maintain temporal integrity within the date values in the private data set 102, in a further embodiment. For example, the private data set 102 contains a birth date, enlistment date and retirement date. Blind masking of these values, or as described above, blind substitution for these values, without regard to temporal integrity may result in masked date values that show that the customer enlisted before they were born, or retired before they enlisted. When using this information to return financial forecasts, such lack of temporal integrity would lead to multiple errors in the testing of systems performing such functions. The date module 234 reads a configuration item from the configuration file which defines the range within which an individual date can be move, defined as a plus or minus number of days. The date module 234 performs a one-way hash function on the original value, a one-way hash function on the synchronization key, appends the latter to the former and then converts to a number. The date module 234 performs a modulo n function on that number, with n being the total number of days within the allowable range, to determine the masked date value.

In an embodiment, the telephone module 236 is configured to perform one-way hash functions on telephone numbers contained within the private data set. The telephone module 236 may blindly hash the entire telephone number contained within the private data set, if the configuration file notes that suitability of the telephone number is not required. If the configuration file notes that a valid telephone number is required, the telephone module 236 can be configured to hash the entire telephone number, or some subset of it. In one embodiment, the telephone module 236 may perform a hash function on the telephone number within the private data set.

Though individual data type masker modules are shown to be contained within the individual maskers 224, this is not meant to limit the applicability of the masking system 100 to just those data types. Expanding on the above discussion, any type of personal data can be masked using the apparatus described herein, provided a look-up table of valid masked values can be generated providing sufficient security against cryptanalytic attacks to derive the PII contained in the private data set 102.

Methods

FIG. 3A shows a flowchart of a method for masking sets of private data, accordance with an example embodiment. Apparatus to mask private data sets have been described above. Methods of using example embodiments presented above are described here. In an embodiment, the method depicted in FIG. 3 can be carried out on a masking system 100 as described above.

At block 305, a set of private data is received by the masking system 100. The private data set will be used to test production systems for errors. As discussed above, there are many problems associated with using PII as a testing data set. By masking the private data set received at block 305 using the methods described herein, those problems are overcome. At block 310, the private data set is masked using a one-way hash function. The one-way hash function provides a computationally efficient method of taking a string and outputting a seemingly random set of characters. One advantage of one-way hash functions is that though hashing the string is computationally efficient, reversal of the algorithm and deriving the input string from the output string is computationally unfeasible. In one embodiment, the private data is masked at block 310 by first hashing the private data item to derive a lookup value and then looking up a masked value in a table of possible lookup values. In another embodiment, hashing the private data includes hashing the private data and then performing a modulo n function, where n represents the number of possible masked values (such as 10, where the data is a number).

At block 315, the masked data is provided to a test system. In one embodiment, the private data is received at block 305 as a single table of data that requires masking. In such an example, a table of masked data is output and provided at block 315. The masked data can then be transmitted or sent to the testing system for input and further operations. In an alternate embodiment, the testing system requests a set of masked data in real-time, that is concurrent with testing operations. In such an example, the private data is received at block 305 and the masked data provided at block 315 is transmitted to the requesting testing system.

Figure 3B:
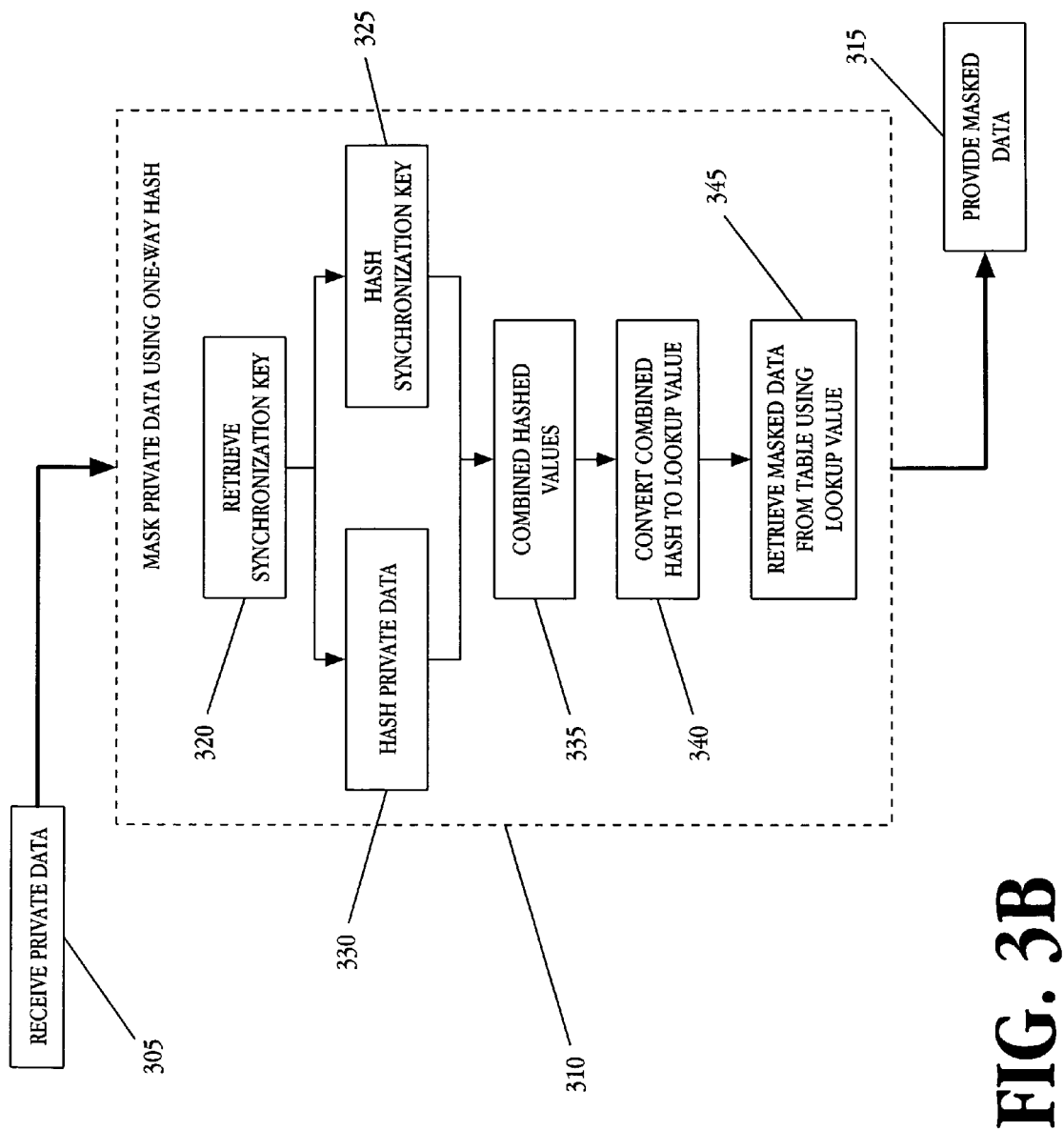
FIG. 3B shows a flowchart of a method for masking sets of private data, accordance with an example embodiment

FIG. 3B shows a flowchart of a method for masking sets of private data, accordance with an example embodiment. In an embodiment, the method shown in FIG. 3B is similar to that depicted above in FIG. 3A, but expanding on the sub-operations at block 310.

At block 310, the private data set is masked using a one-way hash function. At block 320, a synchronization key is retrieved. In one embodiment, the synchronization key is contained within the configuration file described above. In such an example, the synchronization key is any string of characters. The use of a pre-supplied synchronization key provides the user of the masking system 100 the ability to seed the hashing functions in identical manners in both present and future sessions. In an alternate embodiment, the synchronization key is retrieved from the initialization module 222 of the masking system 100. In such an example, the synchronization key is generated dynamically by the initialization module. The synchronization key can be generated using the time when the key was requested, or any other suitable method that would dynamically generate a character string.

At block 325 and block 330, the synchronization key and the private data, respectively, are hashed. This may be done concurrently, as is depicted in FIG. 3B, in some embodiments, but may also be done in series. If the latter, either operation can be performed first without altering the results of later operations. Following the hashing of the synchronization key and the private data, the hashed values are combined at block 335 in any suitable manner, such as appending the private data hashed value to the synchronization key hashed value, or vice versa. Alternatively, the hashed values may be combined by multiplying them, or performing any other mathematical operation on them to arrive at a single value.

At block 340, the combined hashed values are converted into a look-up value. This may be done, in some examples, by deriving a numerical value from the hashed value. For instance, each character in a hashed string of characters can represent a numerical value. When multiplied in order, a numerical value can be obtained. Alternatively, the numerical values can be added. The exact mathematical operation is not determinative provided that a numerical value is obtained. At block 345 a masked value from a lookup table will be retrieved using this lookup value. If the table contains 20 rows, the numerical value could be a number between 1 and 20. However, an alternative method would be to apply a modulus function to the numerical value. In this instance, the exact nature of the numerical value, including its size, is immaterial. If the lookup table has 20 rows, applying a modulo 20 to the numerical value will return a value between 1 and 20 regardless of the initial value of the numerical value. Expanding on this, an H modulo n mathematical operation can be performed on the converted hashed values to obtain a lookup value, where n is the number of items in the lookup table and H is the combined and converted hashed values of the private data and the synchronization key.

In one embodiment, the hashing function used at blocks 325 and 330 is an MD5 hashing function that returns a 2048 bit length hash. Combining the hash of the synchronization key and the private data yields a 4096 bit length hash, in this example. In an embodiment, the lookup table has 4096 values, so that a one-to-one matching can be made. Other one-way algorithms may be used provided the end result of the combination at block 335 is processed through an appropriate modulus function. To yield a value that provides a one-to-one mapping from the result to a value in the look-up table.

Additional operations may be performed prior to or after the hashing functions at blocks 325 and 330, in some embodiments. Depending on the data type being hashed, some operations to standardize the output may need to be performed. For example, a character string for an address may be entered into a database differently by different people, with both entries being valid. However, hashing "123 anywhere street" can yield a different result then hashing "123 Anywhere Street," depending on the one-way algorithm used. In such a case, pre-flighting the private data may be required to standardize the input. In this instant example, pre-flighting may consist of converting all alpha characters to lower case so that "Anywhere" becomes "anywhere". Additional operations may include the removal of spaces in the string, so that "Anywhere Street" becomes "anywherestreet." Such operations can be performed as pre-flight operations on any character strings.

Example Implementations

Figure 4:
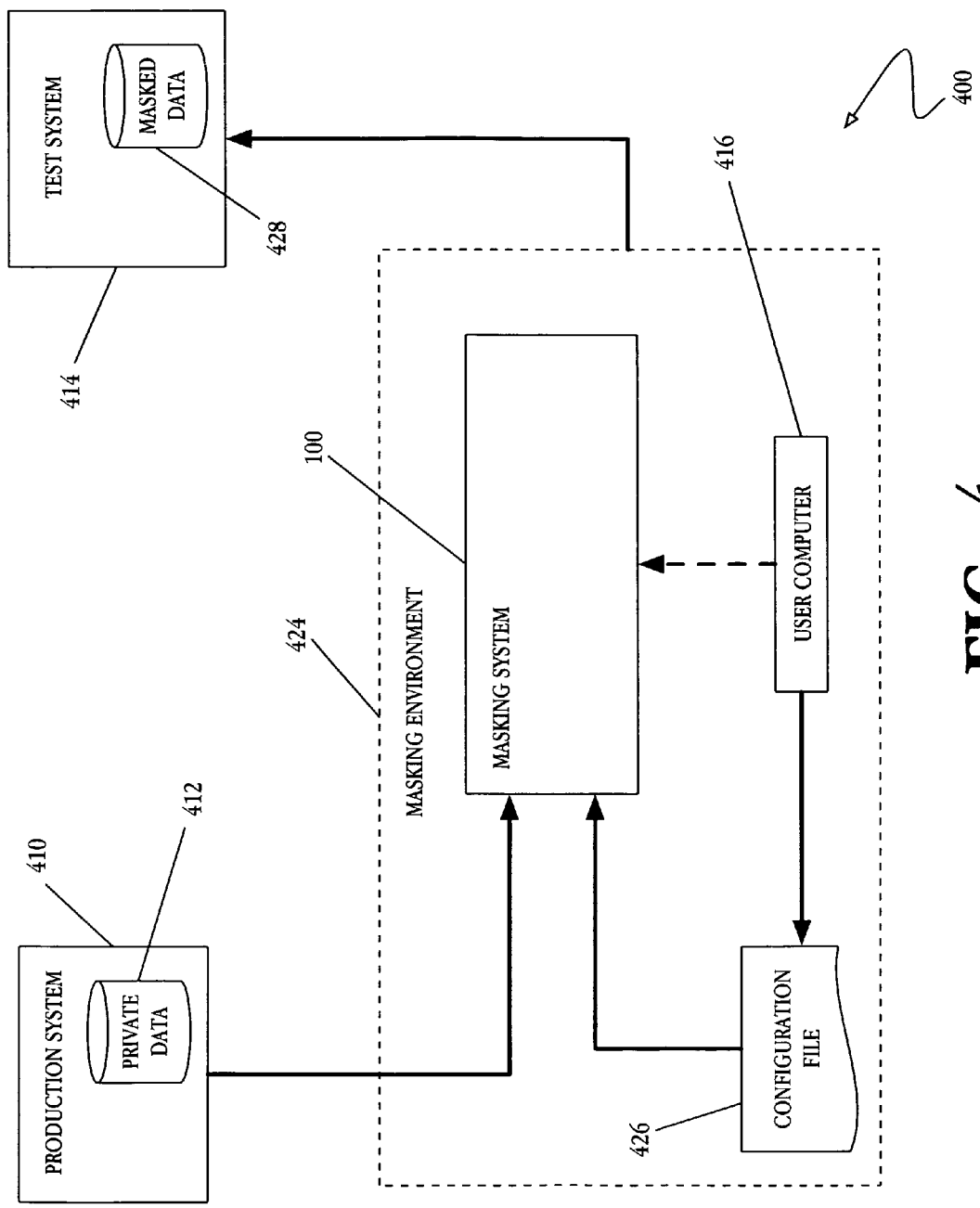
FIG. 4 shows a block diagram of a system for masking sets of private data, in accordance with an example embodiment.

FIG. 4 shows a block diagram of a system that masks private data for use in testing systems, in accordance with an example embodiment. Apparatus and methods for masking private data have been described. An example implementation can now be described with reference to those apparatus and methods. The system 400 shown in FIG. 4 is only one example implementation of the apparatus and systems. The system 400 includes a production system 410 which contains some private data 412. In this example, a user intends to provide that private data 412 to a test system 414 for testing operations. The user, through interaction with a user computer 416, commences operations to mask the private data 412 for the purpose of use in the test system 414. The user computer 416 is coupled to a masking system 100 as described above. Collectively, the masking system 418 and the user computer 416 can be considered to be within a masking environment 424. This is not a structural arrangement, in one example, and is meant to be more a logical grouping of individual components in the system 100.

The production system 410 contains private data 412, in one embodiment, the private data 412 containing personally identifiable information. The user initiates masking operations by requesting the private data be supplied from the production system, in one example, through a masking system 418. In an alternate embodiment, the private data 412 is extracted from the production system by the user and sent from the user computer 416 to the masking system 418.

The user also supplies one or more configuration settings in a configuration file 426, in one embodiment. The configuration file 426 contains information regarding the operation of the masking system 418, such as reserved words, a synchronization key, tolerances for date masking, tolerances for location masking, and the like. In an alternate embodiment, the configuration file 426 is a default configuration file where the user supplies no configuration settings prior to the commencement of the operations. In the former example, the masking system 100 reads the configuration file 426 and masks the private data 412 according to the configuration file 426. This includes hashing a synchronization key contained within the configuration file 426. In the latter example, the masking system 100 implements default configuration settings prior to commencement of the operations. The synchronization key in this example is a timestamp, which can then be hashed as discussed above.

The masking system 100 provides the masked data 428 to the test system, in one embodiment. In an alternate embodiment, where the private data 412 is supplied by the user and not retrieved from the production system, the masked data 428 is sent back to the user.

Figure 5:
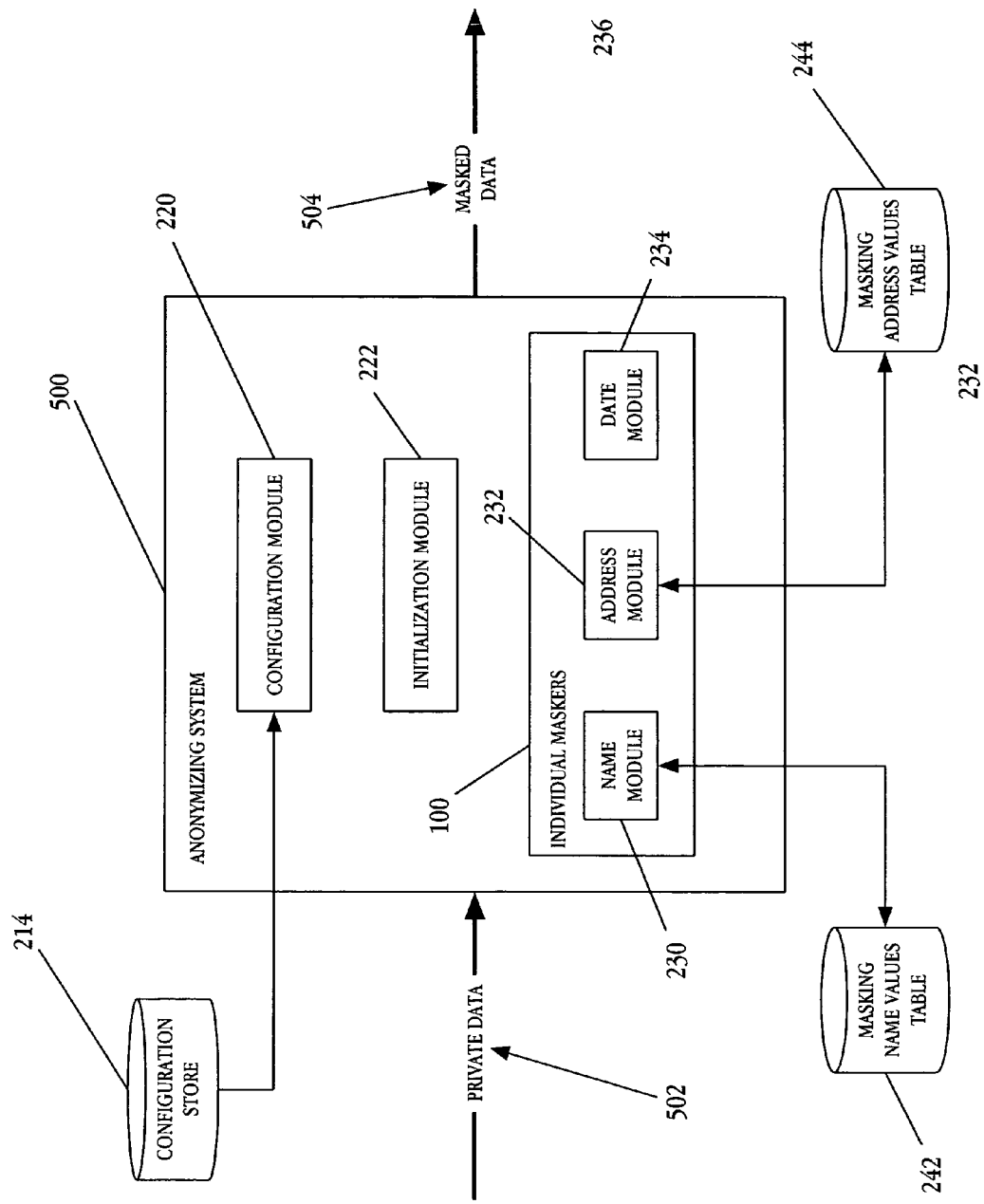
FIG. 5 shows a block diagram of a system for anonymizing personal data, in accordance with an example embodiment.

FIG. 5 shows a block diagram of a system for anonymizing personal data, in accordance with an example embodiment. As discussed above, provision of private data to a test system results in a possible exploitation of that private data. The methods and systems discussed above were in regards to production and test systems. Alternatively, some of the methods and systems could be used by an individual user for the masking of their own personal data.

The anonymizing system 500, in one embodiment, provides masking services to an individual user. The anonymizing system 500 is operable on a user computer and is configured to receive private data 502 from the user and output masked data 504. The anonymizing system 100 is configured similarly to the masking system 100 discussed above. However, in an alternate example, some of the submodules coupled to the anonymizing system 100 are less robust then those coupled to the masking system 100. For example, whereas the masking system 100 described above is, in practice, manipulating personal data for many users concurrently, the anonymizing system 500 is only manipulating personal data for one user. Based on that, the potential set of masked data that could be used by an attacker is much smaller then above, therefore the number of values in the lookup tables can also be smaller. Additionally, the configuration file in the configuration store 214 can also be limited in scope with respect to the anonymizing system.

The anonymizing system 500 described here may be used in conjunction with any software application executed on the user's computer that sends private data across a network. When interacting with certain networked systems, the user may wish their true identity to remain a secret and not be divulged to those systems. However, in order to fully maximize their user experience, data provided to those systems should appear real. For instance, supplying "111 Anywhere St" to that system may result in the system rejecting the entry. By using the systems and methods described herein, a user can supply an actual address, as well as an apparently real name to those systems. No discussion is made here with regards to the supplying of what may be considered false but real data to those systems, only that a user wishing to remain anonymous may wish to mask their data but still retain the air of legitimacy in their online interactions.

As discussed above, the configuration file may contain a synchronization key or it may not, in which case the synchronization key is generated using a timestamp. In the anonymizing system 500 this may be unwanted, as the user may wish at some point in the future to interact again with this same system. If a timestamp is used as a synchronization key, it is highly unlikely that the user would be able to re-supply that exact key at some point in the future. Use of a password or pass-phrase as the synchronization key, one which can be stored securely in the configuration file, allows the user the ability to mask their data exactly the same in further interactions with any other systems.

FIG. 6 shows a block diagram of a machine including instructions to perform any one or more of the methodologies described herein. A system 600 includes a computer 610 connected to a network 614. The computer 610 includes a processor 620, a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 614, reads and stores code and data in the storage device 622, and presents data to the output device 624.

Although the computer 610 is shown to contain only a single processor 620 and a single bus 630, the disclosed embodiment applies equally to computers that may have multiple processors, and to computers that may have multiple busses with some or all performing different functions in different ways.

The storage device 622 represents one or more mechanisms for storing data. For example, the storage device 622 may include read only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the functions, as described above. In another embodiment, some or all of the functions are carried out via hardware in lieu of a processor-based system. In one embodiment, the controller is a web browser, but in other embodiments, the controller may be a database system, a file system, an electronic mail system, a media manager, an image manager, or may include any other functions capable of accessing data items. Of course, the storage device 622 may also contain additional software and data (not shown), which is not necessary to understanding the invention.

Although the controller and the data items 634 are shown to be within the storage device 622 in the computer 610, some or all of them may be distributed across other systems, for example on a server and accessed via the network 614.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 614 through any suitable communications protocol. The network interface device 628 sends and receives data items from the network 614.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 614 may be any suitable network and may support any appropriate protocol suitable for communication to the computer 610. In an embodiment, the network 614 may support wireless communications. In another embodiment, the network 614 may support hard-wired communications, such as a telephone line or cable. In another embodiment, the network 614 may support the Ethernet IEEE (Institute of Electrical and Electronics Engineers) 802.3x specification. In another embodiment, the network 614 may be the Internet and may support IP (Internet Protocol). In another embodiment, the network 614 may be a local area network (LAN) or a wide area network (WAN). In another embodiment, the network 614 may be a hotspot service provider network. In another embodiment, the network 614 may be an intranet. In another embodiment, the network 614 may be a GPRS (General Packet Radio Service) network. In another embodiment, the network 614 may be any appropriate cellular data network or cell-based radio network technology. In another embodiment, the network 614 may be an IEEE 802.11 wireless network. In still another embodiment, the network 614 may be any suitable network or combination of networks. Although one network 614 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A non-transitory machine-readable medium having machine executable instructions for processing a set of private data items contained therein, the machine-executable instructions performing the following operations:
   receiving a set of private data items, the set of private data items containing personally identifiable information including at least one of the following: first name values, middle name values, and last name values;
   retrieving a configuration file containing information regarding transformation of the set of private data items;
   transforming the set of private data items into a set of masked data items using the information, the masked data items containing no personally identifiable information and wherein the set of data items includes:
   retrieving a name value;

hashing the name value to obtain a numerical key; and
retrieving a masked name value from a name table using the numerical key including receiving a synchronization key and hashing the synchronization key to obtain a hashed value;
deriving a second numerical key from the hashed value
combining the second numerical key with the numerical key to obtain a lookup value; and
retrieving a masked name value from the name table using the lookup value
receiving a request from a testing system for the set of masked data items;
standardizing the set of masked data items; and
providing the set of standardized masked data items to the testing system.

2. The non-transitory machine-readable medium of claim 1, wherein hashing the name value includes hashing the name value using an MD5 hashing algorithm.

3. The non-transitory machine-readable medium of claim 1, wherein the set of private data items includes at least one of the following: name values, residence address values, city values, state values, and zip code values.

4. A non-transitory machine-readable medium having machine executable instructions for anonymizing personal data contained therein, the machine-executable instructions performing the following operations:
receiving personal data from a user wherein the personal data is name data;
retrieving a configuration file containing information regarding transformation of the personal data;
transforming the personal data using the information and one-way hash algorithms to obtain masked data, the masked data suitable for further operations requiring personal information wherein transforming the personal data includes receiving a synchronization key;
hashing the synchronization key using an MD5 hashing algorithm to obtain a first hashed value;
hashing the name data using an MD5 hashing algorithm to obtain a second hashed value;
combining the first hashed value and the second hashed value to obtain a lookup value; and
retrieving masked name data using the lookup value from a masked name value table;
receiving a request from a testing system for the masked data;
standardizing the masked data; and
providing the standardized masked data to the testing system.

5. A non-transitory machine-readable medium having machine executable instructions for anonymizing personal data contained therein, the machine-executable instructions performing the following operations:
receiving personal data from a user wherein the personal data is address data;
retrieving a configuration file containing information regarding transformation of the personal data;
transforming the personal data using the information and one-way hash algorithms to obtain masked data, the masked data suitable for further operations requiring personal information wherein transforming the personal data includes:
receiving a synchronization key;
hashing the synchronization key using an MD5 hashing algorithm to obtain a first hashed value;
hashing the name data using an MD5 hashing algorithm to obtain a second hashed value;
combining the first hashed value and the second hashed value to obtain a lookup value; and
retrieving masked address data using the lookup value from a masked name value table;
receiving a request from a testing system for the masked data;
standardizing the masked data; and
providing the standardized masked data to the testing system.

6. The non-transitory machine-readable medium of claim 4 wherein the personal data contains personally identifiable information.

7. The non-transitory machine-readable medium of claim 4, wherein providing the standardized masked data to the testing system includes providing the masked data to a web browser, the web browser communicatively coupled to a web server, the web server requiring personal information from the user.

8. A non-transitory machine-readable medium having machine-executable instructions to mask private data comprising:
a configuration module to retrieve a configuration file containing information regarding transformation of a private data set;
a masking engine that uses the information to hash the private data set to obtain a lookup value, to retrieve a masked value from a masking values table using the lookup value, to standardize the masked value, to receive a request from a testing system for the masked value, and to provide the standardized masked value to the testing system;
wherein the masking engine comprises:
the configuration module coupled to a configuration data store to retrieve the configuration file and to configure the masking engine using the configuration file;
an initialization module coupled to the configuration module wherein the initialization module is configured to read a synchronization key from the configuration file and provide a hash of a configuration key to at least one of a plurality of individual maskers;
the plurality of individual maskers, each of which is configured to mask a single data type;
the masking values table coupled to the masking engine, the masking values table containing a plurality of masked values, each of which having a unique lookup value;
and the configuration data store coupled to the masking engine, the configuration store containing a plurality of configuration files.

9. The non-transitory machine-readable medium of claim 8, wherein the initialization module is configured to create a synchronization key using a timestamp when the configuration file contains no synchronization key.

10. The non-transitory machine-readable medium of claim 8, wherein the masking engine hashes the private data set using a one-way hash function.

11. The non-transitory machine-readable medium of claim 10, wherein the one-way hash function is an MD5 hashing algorithm.

12. The non-transitory machine-readable medium of claim 5, wherein the synchronization key is a password provided by the user.

* * * * *